(12) United States Patent
Tu

(10) Patent No.: US 12,468,171 B2
(45) Date of Patent: Nov. 11, 2025

(54) STEREOSCOPIC DISPLAY SYSTEM

(71) Applicant: Acer Incorporated, New Taipei (TW)

(72) Inventor: Tsung-Wei Tu, New Taipei (TW)

(73) Assignee: Acer Incorporated, New Taipei (TW)

( * ) Notice: Subject to any disclaimer, the term of this patent is extended or adjusted under 35 U.S.C. 154(b) by 126 days.

(21) Appl. No.: 18/510,684

(22) Filed: Nov. 16, 2023

(65) Prior Publication Data

US 2025/0067993 A1    Feb. 27, 2025

(30) Foreign Application Priority Data

Aug. 22, 2023  (TW) ................................ 112131483

(51) Int. Cl.
*G02B 30/22* (2020.01)
*G06F 3/14* (2006.01)

(52) U.S. Cl.
CPC ............ *G02B 30/22* (2020.01); *G06F 3/1431* (2013.01)

(58) Field of Classification Search
CPC ......... G02B 30/22; G06F 3/1431; H01J 31/22
See application file for complete search history.

(56) References Cited

U.S. PATENT DOCUMENTS

| | | | | |
|---|---|---|---|---|
| 2011/0051237 A1* | 3/2011 | Hasegawa | ............. | G02B 30/30 359/463 |
| 2012/0127570 A1* | 5/2012 | Sakai | .................. | H04N 13/307 359/463 |
| 2023/0412790 A1* | 12/2023 | Won | ..................... | H04N 13/349 |
| 2024/0244175 A1* | 7/2024 | Yano | ..................... | H04N 13/305 |
| 2024/0333900 A1* | 10/2024 | Hsiang | ................ | H04N 13/122 |
| 2024/0372977 A1* | 11/2024 | Hsiang | ................ | H04N 13/296 |
| 2025/0193369 A1* | 6/2025 | Lu | ........................ | H04N 13/156 |

FOREIGN PATENT DOCUMENTS

| | | | | |
|---|---|---|---|---|
| JP | 2014116867 | A * | 6/2014 | |
| JP | 6073121 | B2 * | 2/2017 | |
| TW | 201101001 | | 1/2011 | |
| TW | 201815162 | | 4/2018 | |
| TW | 202201348 | | 1/2022 | |
| TW | 202242635 | | 11/2022 | |
| WO | WO-2010098159 | A1 * | 9/2010 | ......... G02B 27/2214 |
| WO | WO-2022267694 | A1 * | 12/2022 | |

OTHER PUBLICATIONS

English translation (Year: 2022).*
English translation (Year: 2014).*
English translation (Year: 2010).*

* cited by examiner

*Primary Examiner* — Fernando Alcon
(74) *Attorney, Agent, or Firm* — JCIPRNET

(57) ABSTRACT

A stereoscopic display system, including a first stereoscopic display, a second stereoscopic display, and a first controller, is provided. The first stereoscopic display is adapted to make a line of sight of a viewer face a center of a display surface of the first stereoscopic display. The second stereoscopic display is adapted to be disposed next to the first stereoscopic display. A first included angle between a display surface of the second stereoscopic display and an extension surface of the display surface of the first stereoscopic display is greater than 0. The first controller is signally connected to the first stereoscopic display and is electrically connected to the second stereoscopic display.

12 Claims, 8 Drawing Sheets

STEREOSCOPIC DISPLAY SYSTEM

CROSS-REFERENCE TO RELATED APPLICATION

This application claims the priority benefit of Taiwan application serial no. 112131483, filed on Aug. 22, 2023. The entirety of the above-mentioned patent application is hereby incorporated by reference herein and made a part of this specification.

BACKGROUND

Technical Field

The disclosure relates to a display system, and in particular to a stereoscopic display system.

Description of Related Art

Using multiple displays to form a display system can not only implement the effect of a large display screen, but also improve work efficiency and increase entertainment effects. In order to increase the viewing field of view, the display located on the side may be simply rotated by an angle.

However, when the display system is a stereoscopic display system, rotating the stereoscopic display causes the depth/position of the produced stereoscopic image in space to also be rotated, thus making the depths/positions of the stereoscopic images from different stereoscopic displays inconsistent in space, thereby resulting in a poor experience for the viewer.

SUMMARY

The disclosure provides a stereoscopic display system, which can provide an optimal viewing effect.

An embodiment of the disclosure provides a stereoscopic display system, which includes a first stereoscopic display, a second stereoscopic display, and a first controller. The first stereoscopic display is adapted to make a line of sight of a viewer face a center of a display surface of the first stereoscopic display. The second stereoscopic display is adapted to be disposed next to the first stereoscopic display, and a first included angle between a display surface of the second stereoscopic display and an extension surface of the display surface of the first stereoscopic display is greater than 0. The first controller is signally connected to the first stereoscopic display and is electrically connected to the second stereoscopic display. According to the first included angle, the first controller controls the second stereoscopic display, so that a stereoscopic image viewed by the viewer from the display surface of the second stereoscopic display is equivalent to a stereoscopic image from the display surface of the second stereoscopic display when the first included angle is equal to 0.

Based on the above, in an embodiment of the disclosure, the stereoscopic display system is designed as follows. The second stereoscopic display is adapted to be disposed next to the first stereoscopic display, and the first included angle between the display surface of the second stereoscopic display and the extension surface of the display surface of the first stereoscopic display is greater than 0. Therefore, the stereoscopic display system can have a greater field of view range. Furthermore, according to the first included angle, the first controller controls the second stereoscopic display, so that the stereoscopic image viewed by the viewer from the display surface of the second stereoscopic display is equivalent to the stereoscopic image from the display surface of the second stereoscopic display when the first included angle is equal to 0. Therefore, in addition to increasing the field of view, the stereoscopic display system can also produce an optimal image content, giving the viewer a preferred viewing experience.

DESCRIPTION OF THE EMBODIMENTS

Figure 1:
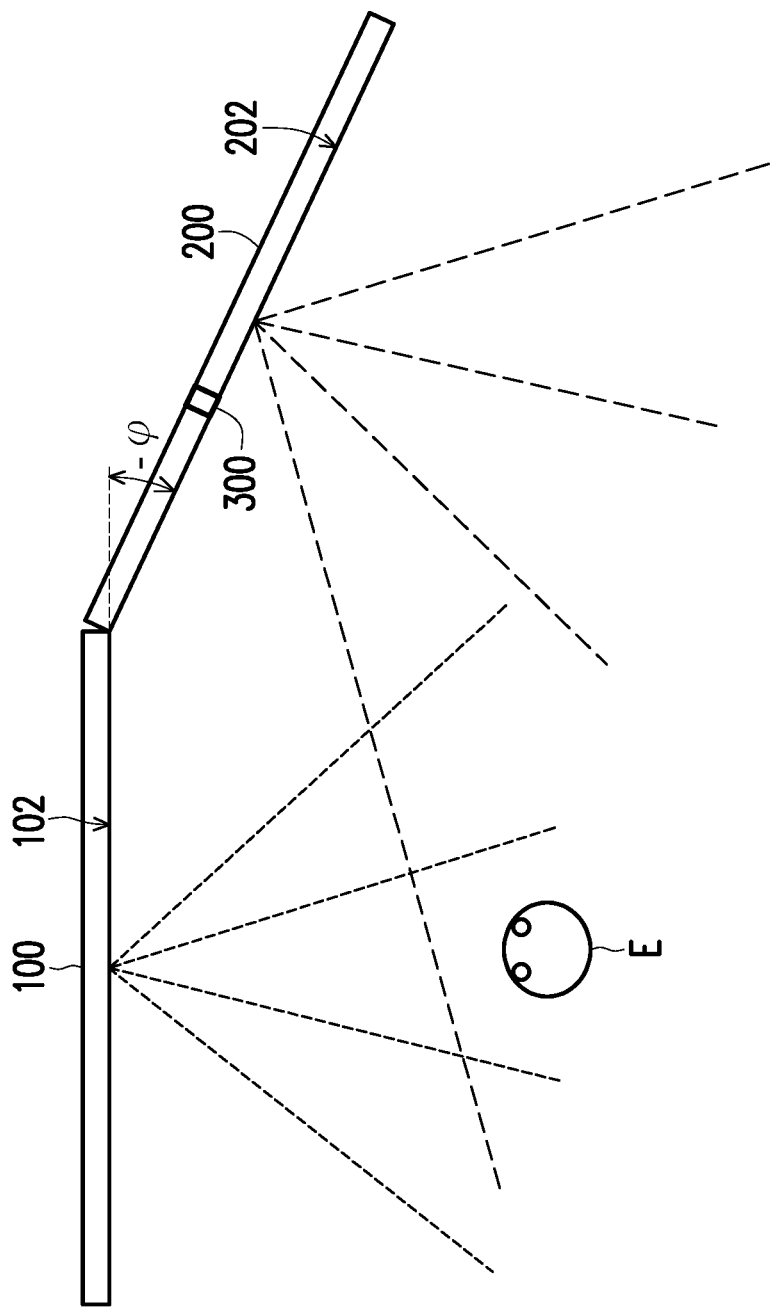
FIG. 1 is a schematic diagram of a stereoscopic display system according to an embodiment of the disclosure.

FIG. 1 is a schematic diagram of a stereoscopic display system according to an embodiment of the disclosure. Please refer to FIG. 1. An embodiment of the disclosure provides a stereoscopic display system 10, which includes a first stereoscopic display 100, a second stereoscopic display 200, and a first controller 300.

In the embodiment, the first stereoscopic display 100 and the second stereoscopic display 200 may be glasses-wearing type or naked-eye type stereoscopic displays, but the disclosure is not limited thereto. The first stereoscopic display 100 is adapted to make a line of sight of a (default) viewer E face (such as directly facing) a center of a display surface 102 of the first stereoscopic display 100. The second stereoscopic display 200 is adapted to be disposed next to the first stereoscopic display 100, and a first included angle $-\varphi$ between a display surface 202 of the second stereoscopic display 200 and an extension surface of the display surface 102 of the first stereoscopic display 100 (toward the second stereoscopic display 200) is greater than 0, where $\varphi>0$.

In the embodiment, the first controller 300 includes, for example, a central processing unit (CPU), a microprocessor, a digital signal processor (DSP), a programmable controller, a programmable logic device (PLD), other similar devices, or a combination of the devices, but the disclosure is not limited thereto. In addition, in an embodiment, each function of the first controller 300 may be implemented as multiple program codes. The program codes are stored in a memory unit, and the first controller 300 executes the program codes. Alternatively, in an embodiment, each function of the first controller 300 may be implemented as one or more circuits.

The disclosure is not limited to using software or hardware to implement each function of the first controller 300.

In the embodiment, the first controller 300 is signally connected to the first stereoscopic display 100 and is electrically connected to the second stereoscopic display 200. According to the first included angle −φ, the first controller 300 controls the second stereoscopic display 200, so that a stereoscopic image viewed by the viewer E from the display surface 202 of the second stereoscopic display 200 is equivalent to a stereoscopic image from the display surface of 200 of the second stereoscopic display 202 when the first included angle −φ is equal to 0. FIG. 1 illustrates that the first controller 300 is disposed in the first stereoscopic display 100, but the disclosure is not limited thereto. In an embodiment, the first controller 300 may be disposed in an external electronic equipment, such as a computer, a laptop, and a smartphone.

Figure 2:
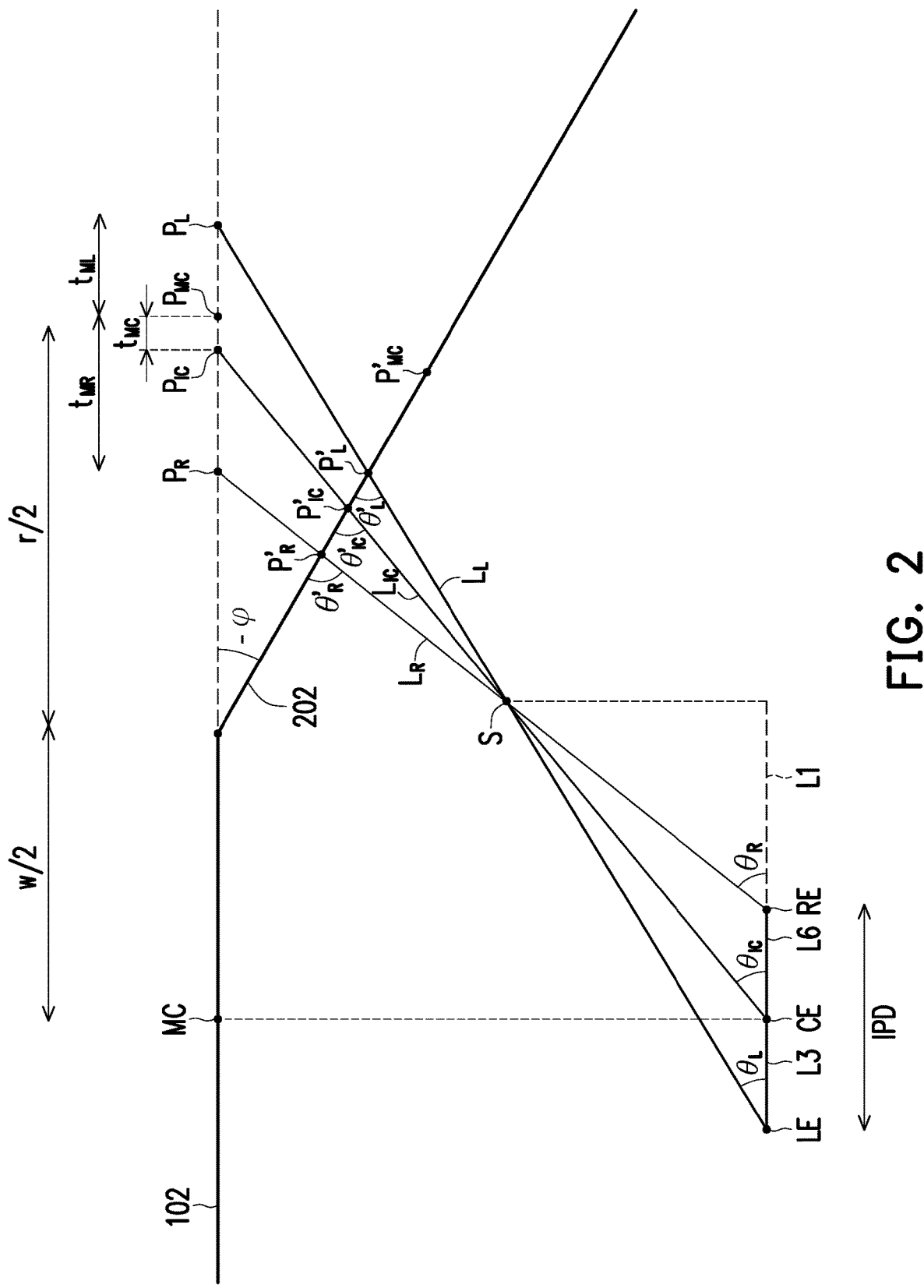
FIG. 2 is a schematic diagram of a geometric relationship between a first stereoscopic display, a second stereoscopic display, and a viewer in FIG. 1 in space.
Figure 3:
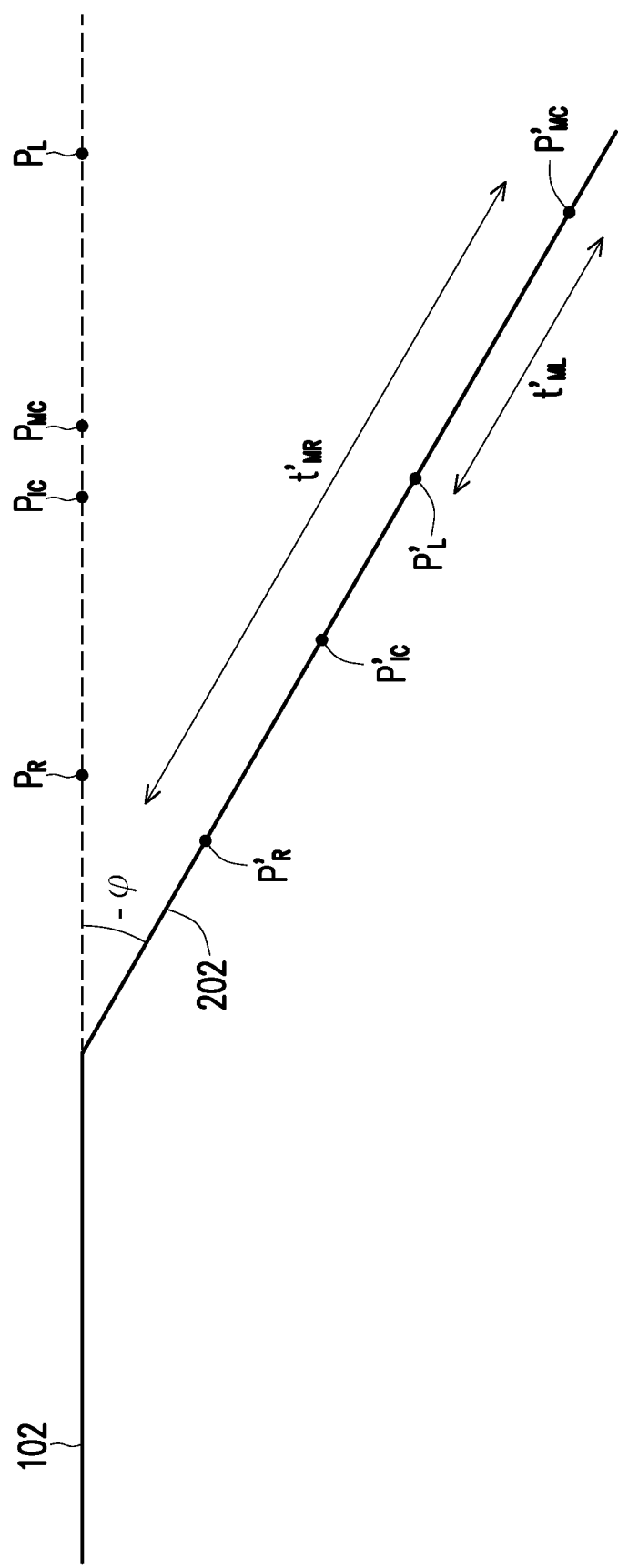
FIG. 3 is a schematic diagram of $t'_{MR}$ and $t'_{ML}$ in FIG. 2.

FIG. 2 is a schematic diagram of a geometric relationship between a first stereoscopic display, a second stereoscopic display, and a viewer in FIG. 1 in space. FIG. 3 is a schematic diagram of t'$_{MR}$ and t'$_{ML}$ in FIG. 2. Please refer to FIG. 2 and FIG. 3. In the embodiment, the first controller 300 calculates a left eye parallax correction amount Δt$_{ML}$ and a right eye parallax correction amount Δt$_{MR}$, and controls the second stereoscopic display 200 according to the left eye parallax correction amount Δt$_{ML}$ and the right eye parallax correction amount Δt$_{MR}$, so that the stereoscopic image viewed by the viewer E from the display surface 202 of the second stereoscopic display 200 is equivalent to the stereoscopic image from the display surface 202 of the second stereoscopic display 200 when the first included angle −φ is equal to 0. Taking a center P'$_{MC}$ of the display surface 202 of the second stereoscopic display 200 as a distance reference point, the left eye parallax correction amount Δt$_{ML}$ and the right eye parallax correction amount Δt$_{MR}$ may be defined as:

$$\begin{cases} \Delta t_{MR} = t'_{MR} - t_{MR} \\ \Delta t_{ML} = t'_{ML} - t_{ML} \end{cases} \quad (1)$$

where t'$_{MR}$ is a right eye parallax amount, and t'$_{ML}$ is a left eye parallax amount. Furthermore, taking a center P$_{MC}$ of the display surface 202 of the second stereoscopic display 200 as the distance reference point and the first included angle −φ being equal to 0, t$_{MR}$ is the right eye parallax amount, and t$_{ML}$ is the left eye parallax amount.

Specifically, in the embodiment, according to a geometric relationship of each of positions MC, P$_R$, P$_{IC}$, P$_{MC}$, P$_L$, P'$_R$, P'$_{IC}$, P'$_L$, P'$_{MC}$, S, LE, CE, and RE in FIG. 2 in space, the following relational expressions may be calculated:

$$P_{IC}(x_{IC}, y_{IC}) = \begin{cases} x_{IC} = \dfrac{d}{\tan\theta_{IC}} = \dfrac{d \cdot x_s}{y_s} \\ y_{IC} = d \end{cases} \quad (2)$$

$$t_{MC} = \dfrac{w}{2} + \dfrac{r}{2} - x_{IC} = \dfrac{w}{2} + \dfrac{r}{2} - \dfrac{d \cdot x_s}{y_s} \quad (3)$$

where the position P$_{IC}$ (also defined as a fourth position) is an intersection point of a straight line L$_{IC}$ (also defined as a fifth straight line) and the display surface 202 of the second stereoscopic display 200 when the first included angle −φ is equal to 0, and the straight line L$_{IC}$ is a straight line formed from a center CE of a left eye LE and a right eye RE of the viewer E passing through a position S(x$_s$, y$_s$) of a stereoscopic image in space to the position P$_{IC}$ of the display surface 202 of the second stereoscopic display 200 when the first included angle −φ is equal to 0; d is a distance between the center CE of the left eye LE and the right eye RE of the viewer E and a center MC of the display surface 102 of the first stereoscopic display 100; w is a width of the first stereoscopic display 100; r is a width of the second stereoscopic display 200; θ$_{IC}$ is an included angle between the straight line L$_{IC}$ and a sixth straight line L6, and the sixth straight line L6 is a straight line formed by the center CE of the left eye LE and the right eye RE and the right eye RE; and t$_{MC}$ is a distance between the position P$_{IC}$ and the position P$_{MC}$, wherein the position P$_{MC}$ is the center of the display surface 202 of the second stereoscopic display 200 when the first included angle −φ is equal to 0.

In the embodiment, according to Expression (2) and Expression (3), the following relational expressions may be calculated:

$$P_{MC}(x_{MC}, y_{MC}) = \begin{cases} x_{MC} = \dfrac{w}{2} + \dfrac{r}{2} \\ y_{MC} = d \end{cases} \quad (4)$$

$$P'_{MC}(x'_{MC}, y'_{MC}) = \begin{cases} x'_{MC} = \dfrac{w}{2} + \dfrac{r}{2} \cdot \cos(-\varphi) \\ y'_{MC} = d + \dfrac{r}{2} \cdot \sin(-\varphi) \end{cases} \quad (5)$$

where the position P'$_{MC}$ is the center of the display surface 202 of the second stereoscopic display 200.

In the embodiment, according to the geometric relationship of each of the positions MC, P$_R$, P$_{IC}$, P$_{MC}$, P$_L$, P'$_R$, P'$_{IC}$, P'$_L$, P'$_{MC}$, S, LE, CE, and RE in FIG. 2 in space, the following relational expressions may be calculated:

$$\tan\theta_R = \dfrac{y_s}{x_s - \dfrac{IPD}{2}} \quad (6)$$

$$\tan\theta_L = \dfrac{y_s}{x_s + \dfrac{IPD}{2}} \quad (7)$$

$$\tan\theta_{IC} = \dfrac{y_s}{x_s} \quad (8)$$

$$P_R(x_R, y_R) = \begin{cases} x_R = \dfrac{\dfrac{IPD}{2}\tan\theta_R + d}{\tan\theta_R} \\ y_R = d \end{cases} \quad (9)$$

$$P_L(x_L, y_L) = \begin{cases} x_L = \dfrac{-\dfrac{IPD}{2}\tan\theta_L + d}{\tan\theta_L} \\ y_L = d \end{cases} \quad (10)$$

$$P_{IC}(x_{IC}, y_{IC}) = \begin{cases} x_{IC} = \dfrac{d}{\tan\theta_{IC}} \\ y_{IC} = d \end{cases} \quad (11)$$

where θ$_R$ is an included angle between a first straight line L1 and a straight line L$_R$ (also defined as a second straight line), the first straight line L1 is an extension line of a straight line (that is, a third straight line L3) formed by the left eye LE and the right eye RE in a direction opposite to the left eye LE with the right eye RE as a starting point, the straight line L$_R$ is a straight line formed by the right eye RE and a position P$_R$ (also defined as a first position) (or the straight line L$_R$ is a straight line formed from the right eye RE of the viewer E passing through the position S(x$_s$, y$_s$) of the stereoscopic image in space to the position P$_R$ of the display surface 202 of the second stereoscopic display 200 when the first included angle −φ is equal to 0), and the position $P_R$ is a position where the stereoscopic image is projected from the display surface 202 of the second stereoscopic display 200 to the right eye RE of the viewer E when the first included angle-q is equal to 0; $θ_L$ is an included angle between the third straight line L3 and a straight line $L_L$ (also defined as a fourth straight line), the straight line $L_L$ is a straight line formed by the left eye LE and a position $P_L$ (also defined as a second position) (or the straight line $L_L$ is a straight line formed from the left eye LE of the viewer E passing through the position $S(x_s, y_s)$ of the stereoscopic image in space to the position $P_L$ of the display surface 202 of the second stereoscopic display 200 when the first included angle −φ is equal to 0), and the position $P_L$ is a position where the stereoscopic image is projected from the display surface 202 of the second stereoscopic display 200 to the left eye LE of the viewer E when the first included angle −φ is equal to 0; and IPD is a distance between the left eye LE and the right eye RE of the viewer E.

In the embodiment, according to the geometric relationship of each of the positions MC, $P_R$, $P_{IC}$, $P_{MC}$, $P_L$, $P'_R$, $P'_{IC}$, $P'_L$, $P'_{MC}$, S, LE, CE, and RE in FIG. 2 in space, the following relational expressions may be calculated:

$$P'_R(x'_R, y'_R) = \begin{cases} x'_R = \dfrac{\dfrac{IPD}{2}\tan θ_R + d - \dfrac{w}{2}\tan(-φ)}{\tan θ_R - \tan(-φ)} \\ y'_R = \dfrac{\dfrac{IPD}{2}\tan(-φ) + d - \dfrac{w}{2}\tan(-φ)}{1 - \dfrac{\tan(-φ)}{\tan θ_R}} \end{cases} \quad (12)$$

$$P'_L(x'_L, y'_L) = \begin{cases} x'_L = \dfrac{-\dfrac{IPD}{2}\tan θ_L + d - \dfrac{w}{2}\tan(-φ)}{\tan θ_L - \tan(-φ)} \\ y'_L = \dfrac{-\dfrac{IPD}{2}\tan(-φ) + d - \dfrac{w}{2}\tan(-φ)}{1 - \dfrac{\tan(-φ)}{\tan θ_L}} \end{cases} \quad (13)$$

$$P'_{IC}(x'_{IC}, y'_{IC}) = \begin{cases} x'_{IC} = \dfrac{d - \dfrac{w}{2}\tan(-φ)}{\tan θ_{IC} - \tan(-φ)} \\ y'_{IC} = \dfrac{d - \dfrac{w}{2}\tan(-φ)}{1 - \dfrac{\tan(-φ)}{\tan θ_{IC}}} \end{cases} \quad (14)$$

where $P'_R(x'_R, y'_R)$ is a position where the stereoscopic image is projected from the display surface 202 of the second stereoscopic display 200 to the right eye RE of the viewer E; $P'_L(x'_L, y'_L)$ is a position where the stereoscopic image is projected from the display surface 202 of the second stereoscopic display 200 to the left eye LE of the viewer E; and $P'_{IC}(x'_{IC}, y'_{IC})$ (also defined as a third position) is an intersection point of the straight line $L_{IC}$ and the display surface 202 of the second stereoscopic display 200.

Next, in the embodiment, according to Expression (2) to Expression (14) above, the right eye parallax amount $t'_{MR}$ and the left eye parallax amount $t'_{ML}$ may be calculated as:

$$\begin{cases} t'_{MR} = \dfrac{y'_R - y'_{MC}}{\sin(-φ)} = \dfrac{x'_R - x'_{MC}}{\cos(-φ)} \\ t'_{ML} = \dfrac{y'_L - y'_{MC}}{\sin(-φ)} = \dfrac{x'_L - x'_{MC}}{\cos(-φ)} \end{cases} \quad (15)$$

Therefore, according to Expression (15), the right eye parallax correction amount $Δt_{MR}$ and the left eye parallax correction amount $Δt_{ML}$ in Expression (1) above may be calculated. In other words, the first controller 300 respectively adds the correction amounts $Δt_{MR}$ and $Δt_{ML}$ to the parallaxes $t_{MR}$ and $t_{ML}$ of a 3D content before rotation to control an image output of the second stereoscopic display 200, so that the stereoscopic image viewed by the viewer E from the display surface 202 of the second stereoscopic display 200 is equivalent to the stereoscopic image from the display surface 202 of the second stereoscopic display 200 when the first included angle −φ is equal to 0. Therefore, in addition to increasing the field of view, the viewing experience of the viewer is also preferred.

In addition to using the center $P'_{MC}$ of the display surface 202 of the second stereoscopic display 200 as the distance reference point to calculate the left eye parallax correction amount $Δt_{ML}$ and the right eye parallax correction amount $Δt_{MR}$ in Expression (1) above, in another embodiment, the first controller 300 may also use the third position $P'_{IC}$ as the distance reference point to calculate the left eye parallax correction amount and the right eye parallax correction amount.

Figure 4:
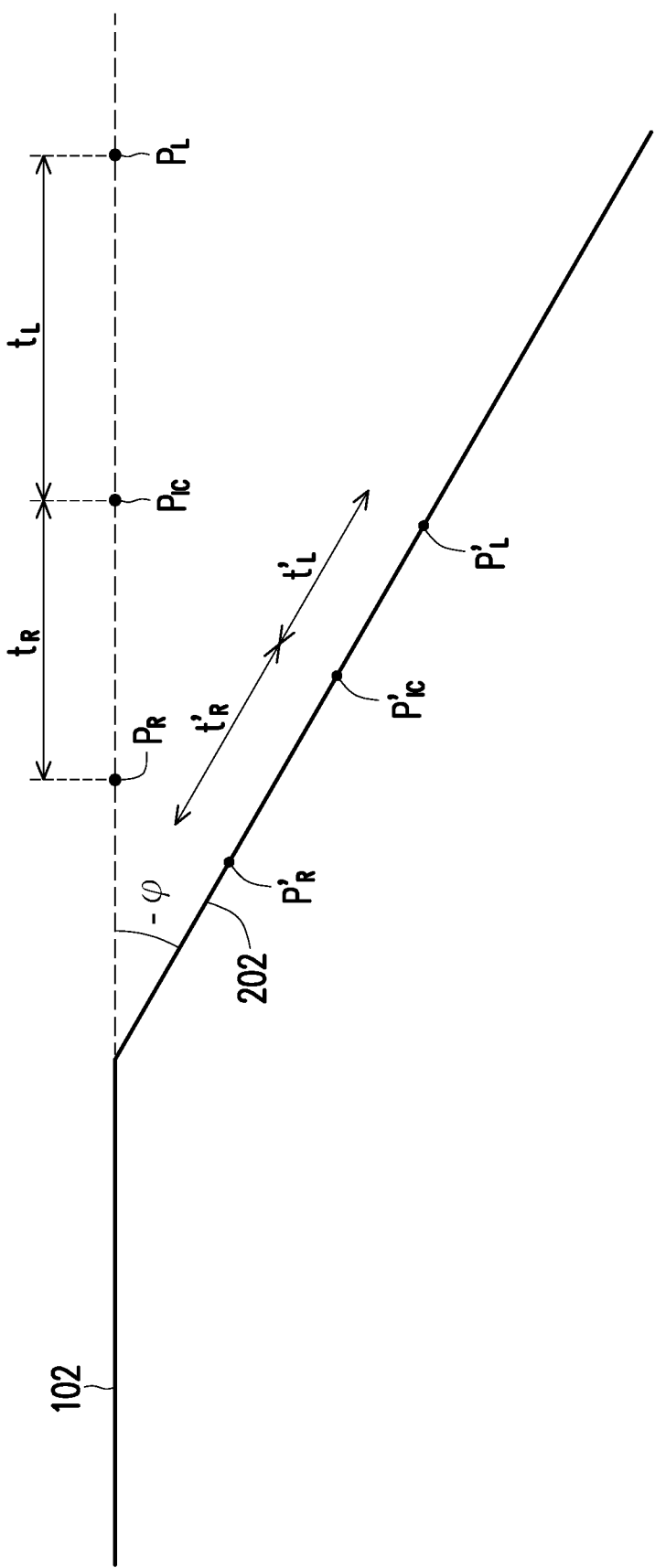
FIG. 4 is a schematic diagram corresponding to FIG. 2 of a right eye parallax amount and a left eye parallax amount according to an embodiment of the disclosure.

FIG. 4 is a schematic diagram corresponding to FIG. 2 of a right eye parallax amount and a left eye parallax amount according to an embodiment of the disclosure. Please refer to FIG. 2 and FIG. 4. In an embodiment, taking the third position $P'_{IC}$ as the distance reference point, the first controller 300 may calculate a left eye parallax correction amount $Δt_L$ and a right eye parallax correction amount $Δt_R$:

$$\begin{cases} Δt_R = t'_R - t_R \\ Δt_L = t'_L - t_L \end{cases} \quad (16)$$

where $t'_R$ is the right eye parallax amount, and $t'_L$ is the left eye parallax amount. Moreover, taking the position $P_{IC}$ as the distance reference point and the first included angle −φ being equal to 0, $t_R$ is the right eye parallax amount, and $t_L$ is the left eye parallax amount.

In the embodiment, according to FIG. 2 and FIG. 4, Expression (17) below may be calculated:

$$\begin{cases} t'_R = \dfrac{y'_R - y'_{IC}}{\sin(-φ)} = \dfrac{x'_R - x'_{IC}}{\cos(-φ)} \\ t'_L = \dfrac{y'_L - y'_{IC}}{\sin(-φ)} = \dfrac{x'_L - x'_{IC}}{\cos(-φ)} \end{cases} \quad (17)$$

Therefore, according to Expression (17), Expression (12), Expression (13), and Expression (14), the left eye parallax correction amount $Δt_L$ and the right eye parallax correction amount $Δt_R$ in Expression (16) above may be calculated.

Figure 5:
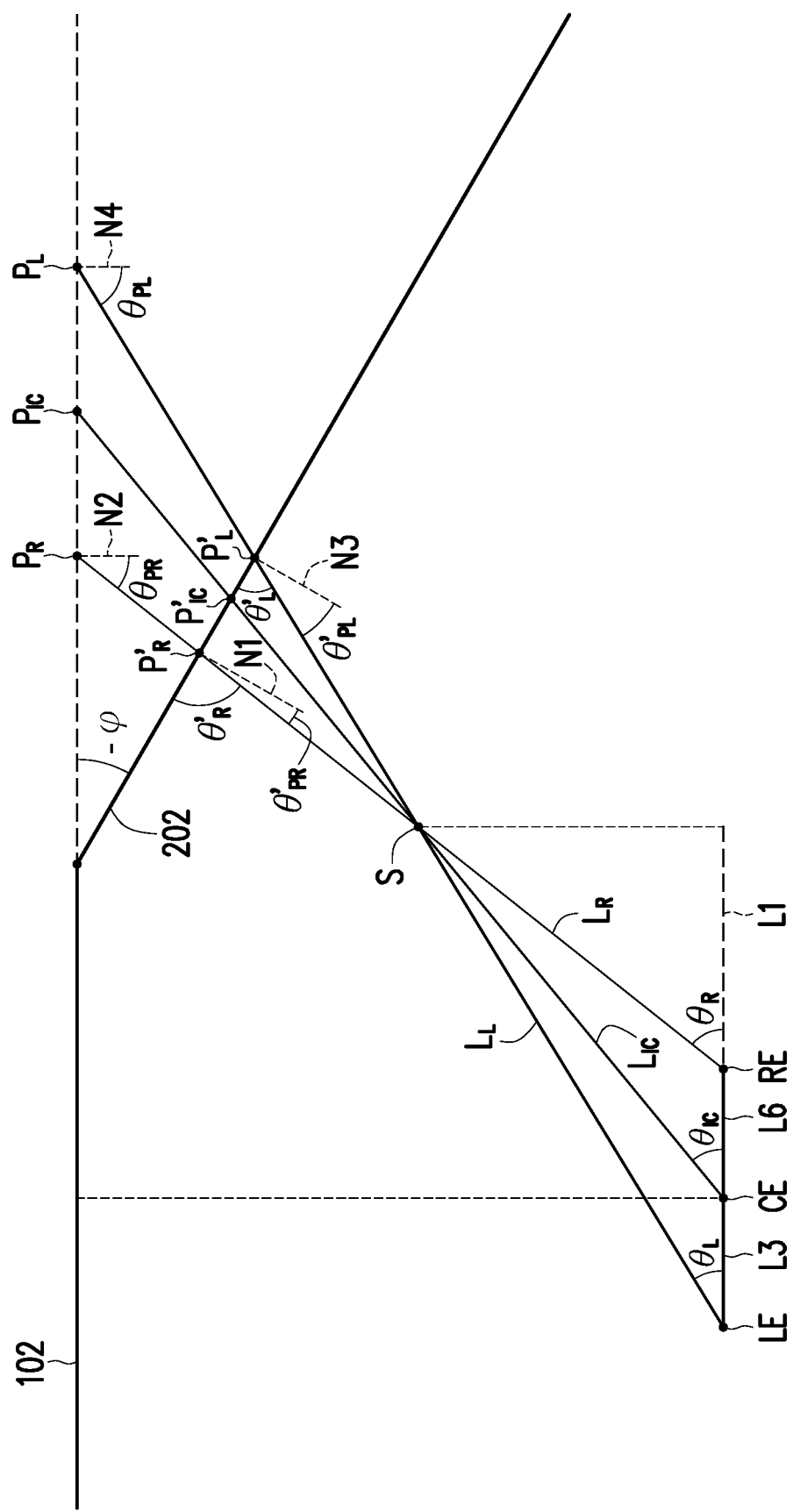
FIG. 5 is a schematic diagram of a right eye angle correction amount and a left eye angle correction amount according to an embodiment of the disclosure.

FIG. 5 is a schematic diagram of a right eye angle correction amount and a left eye angle correction amount according to an embodiment of the disclosure. Please refer to FIG. 2 and FIG. 5. In the embodiment, the first controller 300 calculates a left eye angle correction amount $Δθ_{PL}$ and a right eye angle correction amount $Δθ_{PR}$, and controls the second stereoscopic display 200 according to the left eye angle correction amount $Δθ_{PL}$ and the right eye angle correction amount $Δθ_{PR}$ to correct an angle of an image content from the second stereoscopic display 200.

Specifically, in the embodiment, the right eye angle correction amount $\Delta\theta_{PR}$ and the left eye angle correction amount $\Delta\theta_{PL}$ may be respectively defined as:

$$\begin{cases} \Delta\theta_{PR} = \theta'_{PR} - \theta_{PR} \\ \Delta\theta_{PL} = \theta'_{PL} - \theta_{PL} \end{cases} \quad (18)$$

where $\theta'_{PR}$ is an included angle between the straight line $L_R$ and a normal vector N1 at the position $P'_R$ where the stereoscopic image is projected from the display surface 202 of the second stereoscopic display 200 to the right eye RE of the viewer E, $\theta_{PR}$ is an included angle between the straight line $L_R$ and a normal vector N2 at the position $P_R$ where the stereoscopic image is projected from the display surface 202 of the second stereoscopic display 200 to the right eye RE of the viewer E when the first included angle $-\theta$ is equal to 0, $\theta'_{PL}$ is an included angle between the straight line $L_L$ and a normal vector N3 at the position $P'_L$ where the stereoscopic image is projected from the display surface 202 of the second stereoscopic display 200 to the left eye LE of the viewer E, and $\theta_{PL}$ is an included angle between the straight line $L_L$ and a normal vector N4 at the position PL where the stereoscopic image is projected from the display surface 202 of the second stereoscopic display 200 to the left eye LE of the viewer E when the first included angle $-\varphi$ is equal to 0.

In the embodiment, according to FIG. 5, Expression (19) to Expression (22) below may be calculated:

$$\begin{cases} \Delta\theta_{PR} = \theta_R - \theta'_R \\ \Delta\theta_{PL} = \theta_L - \theta'_L \end{cases} \quad (19)$$

$$\begin{cases} \theta'_{PR} = 90° - \theta'_R \\ \theta'_{PL} = 90° - \theta'_L \end{cases} \quad (20)$$

$$\begin{cases} \theta_{PR} = 90° - \theta_R \\ \theta_{PL} = 90° - \theta_L \end{cases} \quad (21)$$

$$\begin{cases} \theta'_R = -\varphi + \theta_R \\ \theta'_L = -\varphi + \theta_L \end{cases} \quad (22)$$

Therefore, according to Expression (19), Expression (6), and Expression (7) above, the right eye angle correction amount $\Delta\theta_{PR}$ and the left eye angle correction amount $\Delta\theta_{PL}$ of the Expression (18) may be calculated. In other words, the first controller 300 respectively adds the angle correction amounts $\Delta\theta_{PR}$ and $\Delta\theta_{PL}$ to the angles $\theta_{PR}$ and $\theta_{PL}$ of the image content before rotation to control the image output of the second stereoscopic display 200. Therefore, the corrected image content of the second stereoscopic display 200 can provide the viewer with a preferred viewing experience.

Based on the above, in an embodiment of the disclosure, the stereoscopic display system 10 includes the first stereoscopic display 100, the second stereoscopic display 200, and the first controller 300. The second stereoscopic display 200 is adapted to be disposed next to the first stereoscopic display 100, and the first included angle $-\varphi$ between the display surface 202 of the second stereoscopic display 200 and the extension surface of the display surface 102 of the first stereoscopic display 100 is greater than 0. Therefore, the stereoscopic display system 10 can have a greater field of view range. Furthermore, according to the first included angle $-\varphi$, the first controller 300 controls the second stereoscopic display 200, so that the stereoscopic image viewed by the viewer E from the display surface 202 of the second stereoscopic display 200 is equivalent to the stereoscopic image from the display surface 202 of the second stereoscopic display 200 when the first included angle $-\varphi$ is equal to 0. Therefore, in addition to increasing the field of view, the stereoscopic display system 10 can also produce the optimal image content, giving the viewer a preferred viewing experience.

Figure 6:
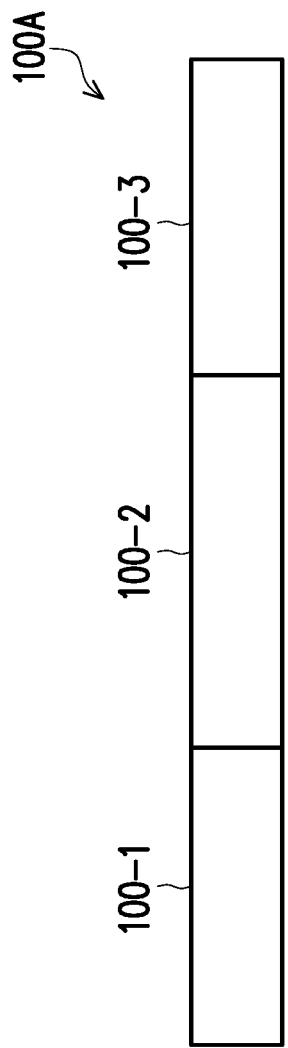
FIG. 6 is a schematic diagram of a first stereoscopic display in a stereoscopic display system according to an embodiment of the disclosure.

FIG. 6 is a schematic diagram of a first stereoscopic display in a stereoscopic display system according to an embodiment of the disclosure. Please refer to FIG. 6. The stereoscopic display system of the embodiment is roughly the same as the stereoscopic display system 10 of FIG. 1. The main difference is that a first stereoscopic display 100A includes multiple first sub-stereoscopic displays 100-1, 100-2, and 100-3. The first sub-stereoscopic displays 100-1, 100-2, and 100-3 are arranged in an array along the display surface 102 of the first stereoscopic display 100. FIG. 6 illustrates three first sub-stereoscopic displays 100-1, 100-2, and 100-3, and the first sub-stereoscopic displays 100-1, 100-2, and 100-3 are arranged in a 1×3 matrix, but the disclosure is not limited to the number and the arrangement manner of the first sub-stereoscopic displays. The advantage of the stereoscopic display system of the embodiment is the same as that of the stereoscopic display system 10 and will not be described again here.

Figure 7:
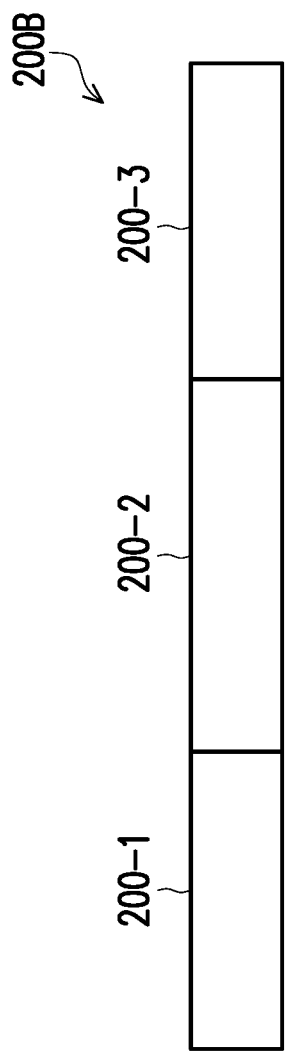
FIG. 7 is a schematic diagram of a second stereoscopic display in a stereoscopic display system according to an embodiment of the disclosure.

FIG. 7 is a schematic diagram of a second stereoscopic display in a stereoscopic display system according to an embodiment of the disclosure. Please refer to FIG. 7. The stereoscopic display system of the embodiment is roughly the same as the stereoscopic display system 10 of FIG. 1 or the stereoscopic display system corresponding to FIG. 6. The main difference is that a second stereoscopic display 200B includes multiple second sub-stereoscopic displays 200-1, 200-2, and 200-3. The second sub-stereoscopic displays 200-1, 200-2, and 200-3 are arranged in an array along the display surface 202 of the second stereoscopic display 200B. FIG. 7 illustrates three second sub-stereoscopic displays 200-1, 200-2, and 200-3, and the second sub-stereoscopic displays 200-1, 200-2, and 200-3 are arranged in a 1×3 matrix, but the disclosure is not limited to the number and the arrangement manner of the second sub-stereoscopic displays. The advantage of the stereoscopic display system of the embodiment is the same as that of the stereoscopic display system 10 and will not be described again here.

Figure 8:
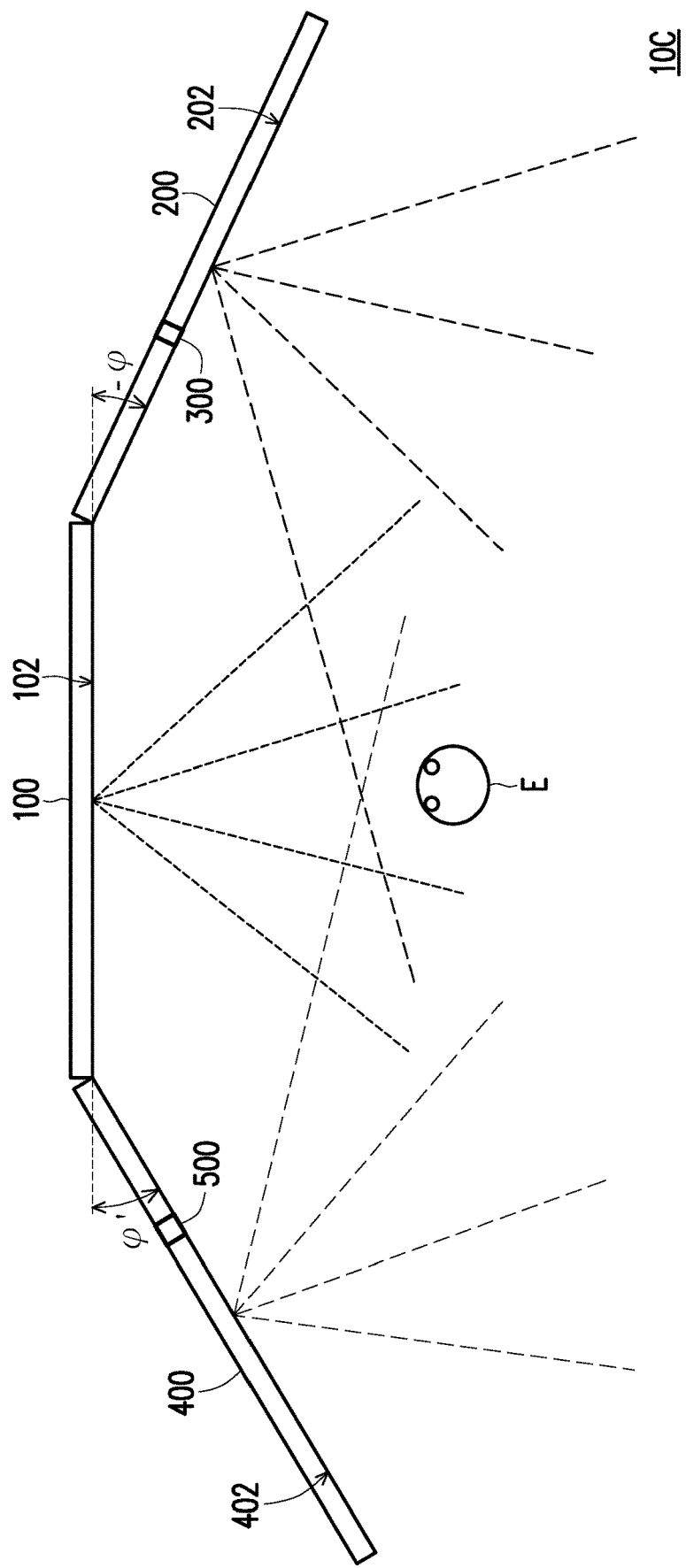
FIG. 8 is a schematic diagram of a stereoscopic display system according to an embodiment of the disclosure.

FIG. 8 is a schematic diagram of a stereoscopic display system according to an embodiment of the disclosure. Please refer to FIG. 8. A stereoscopic display system 10C of the embodiment is roughly the same as the stereoscopic display system 10 of FIG. 1 or the stereoscopic display systems corresponding to FIG. 6 and FIG. 7. The main difference is that the stereoscopic display system 10C further includes a third stereoscopic display 400 and a second controller 500.

In the embodiment, the third stereoscopic display 400 may be a glasses-wearing type or naked-eye type stereoscopic display, but the disclosure is not limited thereto. The third stereoscopic display 400 is adapted to be disposed next to the first stereoscopic display 100 opposite to the second stereoscopic display 200, and a second included angle $\varphi'$ between a display surface 402 of the third stereoscopic display 400 and an extension surface of the display surface 102 of the first stereoscopic display 100 (toward the third stereoscopic display 400) is greater than 0, where $\varphi'>0$.

In the embodiment, the second controller 500 includes, for example, a central processing unit (CPU), a microprocessor, a digital signal processor (DSP), a programmable controller, a programmable logic device (PLD), other similar devices, or a combination of the devices, but the disclosure is not limited thereto. In addition, in an embodiment, each function of the second controller 500 may be implemented as multiple program codes. The program codes are stored in a memory unit, and the second controller 500 executes the program codes. Alternatively, in an embodiment, each function of the second controller 500 may be implemented as one or more circuits. The disclosure is not limited to using software or hardware to implement each function of the second controller 500.

In the embodiment, the second controller 500 is signally connected to the first stereoscopic display 100 and is electrically connected to the third stereoscopic display 400.

In the embodiment, according to the second included angle φ', the second controller 500 controls the third stereoscopic display 400, so that the stereoscopic image viewed by the viewer E from the display surface 402 of the third stereoscopic display 400 is equivalent to the stereoscopic image from the display surface 402 of the third stereoscopic display 400 when the second included angle φ' is equal to 0. FIG. 8 illustrates that the second controller 500 is disposed in the third stereoscopic display 400, but the disclosure is not limited thereto. In an embodiment, the second controller 500 may be disposed in an external electronic equipment, such as a computer, a laptop, and a smartphone. Moreover, in another embodiment, the first controller 300 and the second controller 500 may be integrated into the same controller.

In the embodiment, the second controller 500 calculates the left eye parallax correction amount and the right eye parallax correction amount, and controls the third stereoscopic display 400 according to the left eye parallax correction amount and the right eye parallax correction amount, so that the stereoscopic image viewed by the viewer E from the display surface 402 of the third stereoscopic display 400 is equivalent to the stereoscopic image from the display surface 402 of the third stereoscopic display 400 when the second included angle φ' is equal to 0. The relational expression of the left eye parallax correction amount and the right eye parallax correction amount corresponding to the third stereoscopic display 400 is similar to Expression (1) or Expression (16) above, and the calculation process thereof is also similar to Expression (2) to Expression (15) and Expression (17), and will not be described again here.

In addition, in an embodiment, the second controller 500 also calculates the left eye angle correction amount and the right eye angle correction amount, and controls the third stereoscopic display 400 according to the left eye angle correction amount and the right eye angle correction amount to correct the angle of the image content from the third stereoscopic display 400. The relational expression of the left eye angle correction amount and the right eye angle correction amount corresponding to the third stereoscopic display 400 is similar to Expression (18) above, and the calculation process thereof is also similar to Expression (19) to Expression (21), and will not be described again here.

Figure 9:
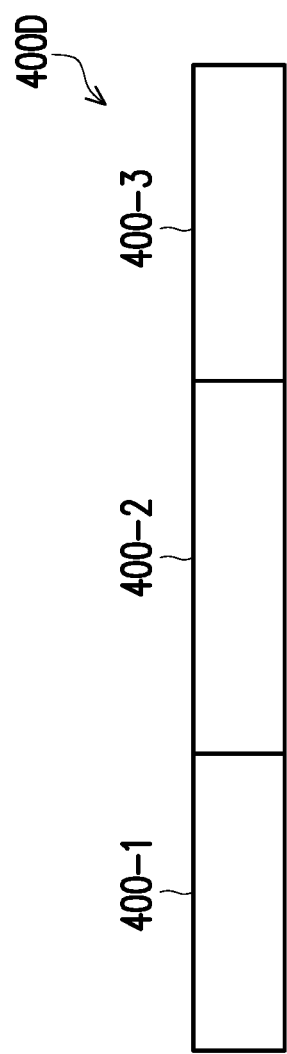
FIG. 9 is a schematic diagram of a third stereoscopic display in a stereoscopic display system according to an embodiment of the disclosure.

FIG. 9 is a schematic diagram of a third stereoscopic display in a stereoscopic display system according to an embodiment of the disclosure. Please refer to FIG. 9. The stereoscopic display system of the embodiment is roughly the same as the stereoscopic display system 10C of FIG. 8. The main difference is that a third stereoscopic display 400D includes multiple third sub-stereoscopic displays 400-1, 400-2, and 400-3, and the third sub-stereoscopic displays 400-1, 400-2, and 400-3 are arranged in an array along the display surface 402 of the third stereoscopic display 400. FIG. 9 illustrates three third sub-stereoscopic displays 400-1, 400-2, and 400-3, and the third sub-stereoscopic displays 400-1, 400-2, and 400-3 are arranged in a 1×3 matrix, but the disclosure is not limited to the number and the arrangement manner of the third sub-stereoscopic displays. The advantage of the stereoscopic display system of the embodiment is the same as that of the stereoscopic display system 10C and will not be described again here.

In summary, in an embodiment of the disclosure, the stereoscopic display system includes the first stereoscopic display, the second stereoscopic display, and the first controller. According to the first included angle, the first controller controls the second stereoscopic display, so that the stereoscopic image viewed by the default viewer from the display surface of the second stereoscopic display is equivalent to the stereoscopic image from the display surface of the second stereoscopic display when the first included angle is equal to 0. Therefore, in addition to increasing the field of view, the stereoscopic display system can also produce the optimal image content, giving the viewer a preferred viewing experience.

What is claimed is:

1. A stereoscopic display system, comprising:
a first stereoscopic display, adapted to make a line of sight of a viewer face a center of a display surface of the first stereoscopic display;
a second stereoscopic display, adapted to be disposed next to the first stereoscopic display, wherein a first included angle between a display surface of the second stereoscopic display and an extension surface of the display surface of the first stereoscopic display is greater than 0; and
a first controller, signally connected to the first stereoscopic display and electrically connected to the second stereoscopic display,
wherein according to the first included angle, the first controller controls the second stereoscopic display, so that a stereoscopic image viewed by the viewer from the display surface of the second stereoscopic display is equivalent to a stereoscopic image from the display surface of the second stereoscopic display when the first included angle is equal to 0,
wherein the first controller calculates a left eye parallax correction amount and a right eye parallax correction amount, and controls the second stereoscopic display according to the left eye parallax correction amount and the right eye parallax correction amount, so that the stereoscopic image viewed by the viewer from the display surface of the second stereoscopic display is equivalent to the stereoscopic image from the display surface of the second stereoscopic display when the first included angle is equal to 0, wherein:

$$\begin{cases} \Delta t_{MR} = t'_{MR} - t_{MR} \\ \Delta t_{ML} = t'_{ML} - t_{ML} \end{cases}$$

where a center of the display surface of the second stereoscopic display is a distance reference point, $\Delta t_{MR}$ is the right eye parallax correction amount, t'MR is a right eye parallax amount, $\Delta t_{ML}$ is the left eye parallax correction amount, and t'ML is a left eye parallax amount, wherein
taking a center of the display surface of the second stereoscopic display as a distance reference point and the first included angle being equal to 0, $t_{MR}$ is a right eye parallax amount, and $t_{MR}$ is a left eye parallax amount.

2. The stereoscopic display system according to claim 1, wherein:

$$\begin{cases} t'_{MR} = \dfrac{y'_R - y'_{MC}}{\sin(-\varphi)} = \dfrac{x'_R - x'_{MC}}{\cos(-\varphi)} \\ t'_{ML} = \dfrac{y'_L - y'_{MC}}{\sin(-\varphi)} = \dfrac{x'_L - x'_{MC}}{\cos(-\varphi)} \end{cases},$$

$$P'_R(x'_R, y'_R) = \begin{cases} x'_R = \dfrac{\dfrac{IPD}{2}\tan\theta_R + d - \dfrac{w}{2}\tan(-\varphi)}{\tan\theta_R - \tan(-\varphi)} \\ y'_R = \dfrac{\dfrac{IPD}{2}\tan(-\varphi) + d - \dfrac{w}{2}\tan(-\varphi)}{1 - \dfrac{\tan(-\varphi)}{\tan\theta_R}} \end{cases},$$

$$P'_L(x'_L, y'_L) = \begin{cases} x'_L = \dfrac{-\dfrac{IPD}{2}\tan\theta_L + d - \dfrac{w}{2}\tan(-\varphi)}{\tan\theta_L - \tan(-\varphi)} \\ y'_L = \dfrac{-\dfrac{IPD}{2}\tan(-\varphi) + d - \dfrac{w}{2}\tan(-\varphi)}{1 - \dfrac{\tan(-\varphi)}{\tan\theta_L}} \end{cases},$$

$$P'_{MC}(x'_{MC}, y'_{MC}) = \begin{cases} x'_{MC} = \dfrac{w}{2} + \dfrac{r}{2}\cdot\cos(-\varphi) \\ y'_{MC} = d + \dfrac{r}{2}\cdot\sin(-\varphi) \end{cases},$$

$$\tan\theta_R = \dfrac{y_s}{x_s - \dfrac{IPD}{2}},$$

$$\tan\theta_L = \dfrac{y_s}{x_s + \dfrac{IPD}{2}},$$

where taking a center of a left eye and a right eye of the viewer as a coordinate origin, −φ is the first included angle, φ>0, P'$_R$(x'$_R$, y'$_R$) is a position where the stereoscopic image is projected from the display surface of the second stereoscopic display to the right eye of the viewer, P'$_L$(x'$_L$, y'$_L$) is a position where the stereoscopic image is projected from the display surface of the second stereoscopic display to the left eye of the viewer, P'$_{MC}$(x'$_{MC}$, y'$_{MC}$) is the center of the display surface of the second stereoscopic display, IPD is a distance between the left eye and the right eye of the viewer, d is a distance between the center of the left eye and the right eye of the viewer and the center of the display surface of the first stereoscopic display, w is a width of the first stereoscopic display, r is a width of the second stereoscopic display, S(x$_s$, y$_s$) is a position of the stereoscopic image in space, θR is an included angle between a first straight line and a second straight line, the first straight line is an extension line of a straight line formed by the left eye and the right eye in a direction opposite to the left eye with the right eye as a starting point, the second straight line is a straight line formed by the right eye and a first position, the first position is a position where the stereoscopic image is projected from the display surface of the second stereoscopic display to the right eye of the viewer when the first included angle is equal to 0, θ$_L$ is an included angle between a third straight line and a fourth straight line, the third straight line is the straight line formed by the left eye and the right eye, the fourth straight line is a straight line formed by the left eye and a second position, and the second position is a position where the stereoscopic image is projected from the display surface of the second stereoscopic display to the left eye of the viewer when the first included angle is equal to 0.

3. A stereoscopic display system, comprising:
a first stereoscopic display, adapted to make a line of sight of a viewer face a center of a display surface of the first stereoscopic display;
a second stereoscopic display, adapted to be disposed next to the first stereoscopic display, wherein a first included angle between a display surface of the second stereoscopic display and an extension surface of the display surface of the first stereoscopic display is greater than 0; and
a first controller, signally connected to the first stereoscopic display and electrically connected to the second stereoscopic display,
wherein according to the first included angle, the first controller controls the second stereoscopic display, so that a stereoscopic image viewed by the viewer from the display surface of the second stereoscopic display is equivalent to a stereoscopic image from the display surface of the second stereoscopic display when the first included angle is equal to 0,
wherein the first controller calculates a left eye parallax correction amount and a right eye parallax correction amount, and controls the second stereoscopic display according to the left eye parallax correction amount and the right eye parallax correction amount, so that the stereoscopic image viewed by the viewer from the display surface of the second stereoscopic display is equivalent to the stereoscopic image from the display surface of the second stereoscopic display when the first included angle is equal to 0, wherein:

$$\begin{cases} \Delta t_R = t'_R - t_R \\ \Delta t_L = t'_L - t_L \end{cases}$$

where taking a third position a distance reference point, $\Delta t_R$ is the right eye parallax correction amount, t'$_R$ is a right eye parallax amount, $\Delta t_L$ is the left eye parallax correction amount, t'$_L$ is a left eye parallax amount, the third position is an intersection point of a fifth straight line and the display surface of the second stereoscopic display, and the fifth straight line is a straight line formed from a center of a left eye and a right eye of the viewer passing through a position of the stereoscopic image in space to a fourth position the display surface of the second stereoscopic display, wherein
taking the fourth position as a distance reference point and the first included angle being equal to 0, t$_R$ is a right eye parallax amount, and t$_L$ is a left eye parallax amount.

4. The stereoscopic display system according to claim 3, wherein:

$$\begin{cases} t'_R = \dfrac{y'_R - y'_{IC}}{\sin(-\varphi)} = \dfrac{x'_R - x'_{IC}}{\cos(-\varphi)} \\ t'_L = \dfrac{y'_L - y'_{IC}}{\sin(-\varphi)} = \dfrac{x'_L - x'_{IC}}{\cos(-\varphi)} \end{cases},$$

$$P'_R(x'_R, y'_R) = \begin{cases} x'_R = \dfrac{\dfrac{IPD}{2}\tan\theta_R + d - \dfrac{w}{2}\tan(-\varphi)}{\tan\theta_R - \tan(-\varphi)} \\ y'_R = \dfrac{\dfrac{IPD}{2}\tan(-\varphi) + d - \dfrac{w}{2}\tan(-\varphi)}{1 - \dfrac{\tan(-\varphi)}{\tan\theta_R}} \end{cases},$$

-continued $$P'_L(x'_L, y'_L) = \begin{cases} x'_L = \dfrac{-\dfrac{IPD}{2}\tan\theta_L + d - \dfrac{w}{2}\tan(-\varphi)}{\tan\theta_L - \tan(-\varphi)} \\ y'_L = \dfrac{-\dfrac{IPD}{2}\tan(-\varphi) + d - \dfrac{w}{2}\tan(-\varphi)}{1 - \dfrac{\tan(-\varphi)}{\tan\theta_L}} \end{cases},$$

$$P'_{IC}(x'_{IC}, y'_{IC}) = \begin{cases} x'_{IC} = \dfrac{d - \dfrac{w}{2}\tan(-\varphi)}{\tan\theta_{IC} - \tan(-\varphi)} \\ y'_{IC} = \dfrac{d - \dfrac{w}{2}\tan(-\varphi)}{1 - \dfrac{\tan(-\varphi)}{\tan\theta_{IC}}} \end{cases},$$

$$\tan\theta_R = \dfrac{y_s}{x_s - \dfrac{IPD}{2}},$$

$$\tan\theta_L = \dfrac{y_s}{x_s + \dfrac{IPD}{2}},$$

$$\tan\theta_{IC} = \dfrac{y_s}{x_s},$$

where taking the center of the left eye and the right eye of the viewer as a coordinate origin, $-\varphi$ is the first included angle, $\varphi > 0$, $P'_R (x'_R, y'_R)$ is a position where the stereoscopic image is projected from the display surface of the second stereoscopic display to the right eye of the viewer, $P'_L (x'_L, y'_L)$ is a position where the stereoscopic image is projected from the display surface of the second stereoscopic display to the left eye of the viewer, $P'_{IC}(x'_{IC}, y'_{IC})$ is the third position, IPD is a distance between the left eye and the right eye of the viewer, d is a distance between the center of the left eye and the right eye of the viewer and the center of the display surface of the first stereoscopic display, w is a width of the first stereoscopic display, $S(x_s, y_s)$ is a position of the stereoscopic image in space, $\theta_R$ is an included angle between a first straight line and a second straight line, the first straight line is an extension line of a straight line formed by the left eye and the right eye in a direction opposite to the left eye with the right eye as a starting point, the second straight line is a straight line formed by the right eye and a first position, the first position is a position where the stereoscopic image is projected from the display surface of the second stereoscopic display to the right eye of the viewer when the first included angle is equal to 0, $\theta_L$ is an included angle between a third straight line and a fourth straight line, the third straight line is the straight line formed by the left eye and the right eye, the fourth straight line is a straight line formed by the left eye and a second position, the second position is a position where the stereoscopic image is projected from the display surface of the second stereoscopic display to the left eye of the viewer when the first included angle is equal to 0, $\theta_{IC}$ is an included angle between the fifth straight line and a sixth straight line, and the sixth straight line is a straight line formed by the center of the left eye and the right eye and the right eye.

5. The stereoscopic display system according to claim 1, wherein the first controller calculates a left eye angle correction amount and a right eye angle correction amount, and controls the second stereoscopic display according to the left eye angle correction amount and the right eye angle correction amount, wherein:

$$\begin{cases} \Delta\theta_{PR} = \theta'_{PR} - \theta_{PR} \\ \Delta\theta_{PL} = \theta'_{PL} - \theta_{PL} \end{cases}$$

where $\Delta\theta_{PR}$ is the right eye angle correction amount, $\theta'_{PR}$ is an included angle between a second straight line and a normal vector at a position where the stereoscopic image is projected from the display surface of the second stereoscopic display to the right eye of the viewer, the second straight line is a straight line formed by the right eye and a first position, the first position is a position where the stereoscopic image is projected from the display surface of the second stereoscopic display to the right eye of the viewer when the first included angle is equal to 0, $\theta_{PR}$ is an included angle between the second straight line and a normal vector at the position where the stereoscopic image is projected from the display surface of the second stereoscopic display to the right eye of the viewer when the first included angle is equal to 0, $\Delta\theta_{PL}$ is the left eye angle correction amount, $\theta'_{PL}$ is an included angle between a fourth straight line and a normal vector at a position where the stereoscopic image is projected from the display surface of the second stereoscopic display to the left eye of the viewer, the fourth straight line is a straight line formed by the left eye and a second position, the second position is a position where the stereoscopic image is projected from the display surface of the second stereoscopic display to the left eye of the viewer when the first included angle is equal to 0, and $\theta_{PL}$ is an included angle between the fourth straight line and a normal vector at the position where the stereoscopic image is projected from the display surface of the second stereoscopic display to the left eye of the viewer when the first included angle is equal to 0.

6. The stereoscopic display system according to claim 5, wherein:

$$\begin{cases} \Delta\theta_{PR} = \theta_R - \theta'_R \\ \Delta\theta_{PL} = \theta_L - \theta'_L \end{cases},$$

$$\begin{cases} \theta'_{PR} = 90° - \theta'_R \\ \theta'_{PL} = 90° - \theta'_L \end{cases},$$

$$\begin{cases} \theta_{PR} = 90° - \theta_R \\ \theta_{PL} = 90° - \theta_L \end{cases},$$

$$\begin{cases} \theta'_R = -\varphi + \theta_R \\ \theta'_L = -\varphi + \theta_L \end{cases}$$

$$\tan\theta_R = \dfrac{y_s}{x_s - \dfrac{IPD}{2}},$$

$$\tan\theta_L = \dfrac{y_s}{x_s + \dfrac{IPD}{2}},$$

where $\theta_R$ is an included angle between a first straight line and the second straight line, the first straight line is an extension line of a straight line formed by the left eye and the right eye in a direction opposite to the left eye with the right eye as a starting point, $\theta_L$ is an included angle between a third straight line and a fourth straight line, the third straight line is the straight line formed by the left eye and the right eye, $\theta'_R$ is an included angle between the first straight line and the display surface of the second stereoscopic display, $\theta'_L$ is an included angle between the fourth straight line and the display surface of the second stereoscopic display, $S(x_s, y_s)$ is a position of the stereoscopic image in space, and IPD is a distance between the left eye and the right eye of the viewer.

7. The stereoscopic display system according to claim 1, wherein the first stereoscopic display comprises a plurality of first sub-stereoscopic displays, and the first sub-stereoscopic displays are arranged in an array along the display surface of the first stereoscopic display.

8. The stereoscopic display system according to claim 1, wherein the second stereoscopic display comprises a plurality of second sub-stereoscopic displays, and the second sub-stereoscopic displays are arranged in an array along the display surface of the second stereoscopic display.

9. The stereoscopic display system according to claim 1, further comprising:
a third stereoscopic display, adapted to be disposed next to the first stereoscopic display opposite to the second stereoscopic display, and a second included angle between a display surface of the third stereoscopic display and an extension surface of the display surface of the first stereoscopic display is greater than 0; and
a second controller, signally connected to the first stereoscopic display and electrically connected to the third stereoscopic display,
wherein according to the second included angle, the second controller controls the third stereoscopic display, so that a stereoscopic image viewed by the viewer from the display surface of the third stereoscopic display is equivalent to a stereoscopic image from the display surface of the third stereoscopic display when the second included angle is equal to 0.

10. The stereoscopic display system according to claim 9, wherein the second controller calculates a left eye parallax correction amount and a right eye parallax correction amount corresponding to the third stereoscopic display, and controls the third stereoscopic display according to the left eye parallax correction amount and the right eye parallax correction amount corresponding to the third stereoscopic display, so that the stereoscopic image viewed by the viewer from the display surface of the third stereoscopic display is equivalent to the stereoscopic image from the display surface of the third stereoscopic display when the second included angle is equal to 0.

11. The stereoscopic display system according to claim 9, wherein the second controller calculates a left eye angle correction amount and a right eye angle correction amount, and controls the third stereoscopic display according to the left eye angle correction amount and the right eye angle correction amount, so that the stereoscopic image viewed by the viewer from the display surface of the third stereoscopic display is equivalent to the stereoscopic image of the display surface of the third stereoscopic display when the second included angle is equal to 0.

12. The stereoscopic display system according to claim 9, wherein the third stereoscopic display comprises a plurality of third sub-stereoscopic displays, and the third sub-stereoscopic displays are arranged in an array along the display surface of the third stereoscopic display.

* * * * *